(12) United States Patent
DeMonte et al.

(10) Patent No.: US 7,522,201 B2
(45) Date of Patent: Apr. 21, 2009

(54) METHOD AND APPARATUS FOR DETECTING FAILED RESET IN PIXELS OF AN IMAGER

(75) Inventors: Frank J. DeMonte, Corvallis, OR (US); Jeffery S. Beck, Philomath, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 818 days.

(21) Appl. No.: 11/048,479

(22) Filed: Jan. 31, 2005

(65) Prior Publication Data

US 2006/0170796 A1    Aug. 3, 2006

(51) Int. Cl.
*H04N 9/64* (2006.01)

(52) U.S. Cl. ............... 348/246; 348/250; 348/221.1

(58) Field of Classification Search ............ 348/222.1, 348/296–308
See application file for complete search history.

(56) References Cited

U.S. PATENT DOCUMENTS

| 6,798,451 | B1 * | 9/2004 | Suzuki et al. | 348/294 |
| 7,015,448 | B2 * | 3/2006 | Barna | 250/208.1 |
| 2003/0001079 | A1 * | 1/2003 | Boemler | 250/208.1 |
| 2003/0042406 | A1 * | 3/2003 | Charbon | 250/214 A |

* cited by examiner

*Primary Examiner*—David L Ometz
*Assistant Examiner*—Usman Khan
(74) *Attorney, Agent, or Firm*—Ratner Prestia (57) ABSTRACT

An apparatus and method for detecting a failed reset in a pixel are described. First, a reset proxy signal that is received. Second, a reset reference signal is received. The reset proxy signal and the reset reference signal are compared. Based on the comparison, a reset status signal is generated. The reset status signal indicates that a failed reset has been detected or that a failed reset has not been detected.

11 Claims, 8 Drawing Sheets

METHOD AND APPARATUS FOR DETECTING FAILED RESET IN PIXELS OF AN IMAGER

BACKGROUND OF THE INVENTION

The design of pixels in imaging electronics is generally well-known by those of ordinary skill in the art. One commonly employed CMOS active pixel sensor (APS) pixel architecture is referred to as a "three-transistor (3T) design" that, as the name implies, includes a first transistor M1, a second transistor M2, and a third transistor M3.

Transistor M1 is a reset transistor that provides a path to charge the photodiode node. When transistor M1 is on, the photodiode node is connected to a power supply signal (e.g., V+). Transistor M2 is a buffer transistor that acts as a voltage buffer between the photodiode node and a common bit line. The photodiode node is read to a common bit line. Since the gate of the transistor M2 is high impedance, the voltage at the photodiode node may be read onto the bit line without affecting the voltage on the photodiode node. Transistor M3 is a row selected device that multiplexes multiple pixels to the common bit line. Transistor M3 of each pixel selectively connects each pixel to the common bit line in a sequential fashion.

A bright signal typically bleeds charge from the photodiode node more quickly than a dark signal. After an integration period, the difference between the integration level and the reset level represents the amount of light that is received by the pixel. When the difference is small, the resulting pixel in the image is relatively dark. Similarly, when the difference is large, the resulting pixel in the image is relatively bright.

An analogy to pixel operation is a bucket of water, where the water represents the charge on the photodiode node. The bucket has a hole, whose size represents the intensity of light received by the pixel. When the size of the hole in the bucket is large (representing a large light intensity), the water (representing charge on the photodiode node) escapes more quickly from the bucket in a given time period (referred to as "integration period"). When the size of-the hole in the bucket is small (representing a small light intensity), the water (representing the charge on the photodiode node) escapes more slowly from the bucket in a given time period (e.g., an integration period). The amount of water that has escaped the bucket in a given time period represents the amount of light received by the pixel during the integration period. As can be appreciated, a proper reset (e.g., filling the bucket to a predetermined level in the above analogy) is important to obtain the proper signal or meaningful value.

For example, when the bucket has no bottom, the bucket cannot be filled to a predetermined level (resetting the photodiode node). In this case, since there is no water in the bucket, there is no meaningful measurement of the amount of water that escapes the bucket since the difference is always zero. This is commonly referred to as a "black sun" problem since the sun, which is a Very bright object, in the scene often causes black spots in the resulting image, which is an undesirable artifact.

One approach to solving the "black sun" problem is to increase the size of the reset pixel. In this manner, as the width of the reset transistor is increased to larger values (e.g., 10 microns), the photodiode node of the pixel can be more readily reset even under bright light conditions. However, since the trend is for digital cameras to offer multiple megapixel imagers, increasing the size of the reset transistor is not a feasible solution.

Based on the foregoing, there remains a need for a method and apparatus for detecting failure to establish a reset signal in pixels of an imager that overcomes the disadvantages set forth previously.

SUMMARY OF THE INVENTION

According to one embodiment of the present invention, an apparatus and method for detecting a failed reset in a pixel are described. First, a reset proxy signal that is received. Second, a reset reference signal is received. The reset proxy signal and the reset reference signal are compared. Based on the comparison, a reset status signal is generated. The reset status signal indicates that a failed reset has been detected or that a failed reset has not been detected.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A method and apparatus for detecting failed-reset in pixels are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A failed reset may be caused by a defective pixel, a bright light source, a glitch in the power supply, or other abnormal operation of one or more circuit elements or components.

According to one embodiment of the invention, the failed reset detection mechanism provides a method and apparatus for detecting a failed reset (e.g., a non-meaningful or erroneous pixel reset signal).

Failed Reset Detection Mechanism 120

Figure 1:
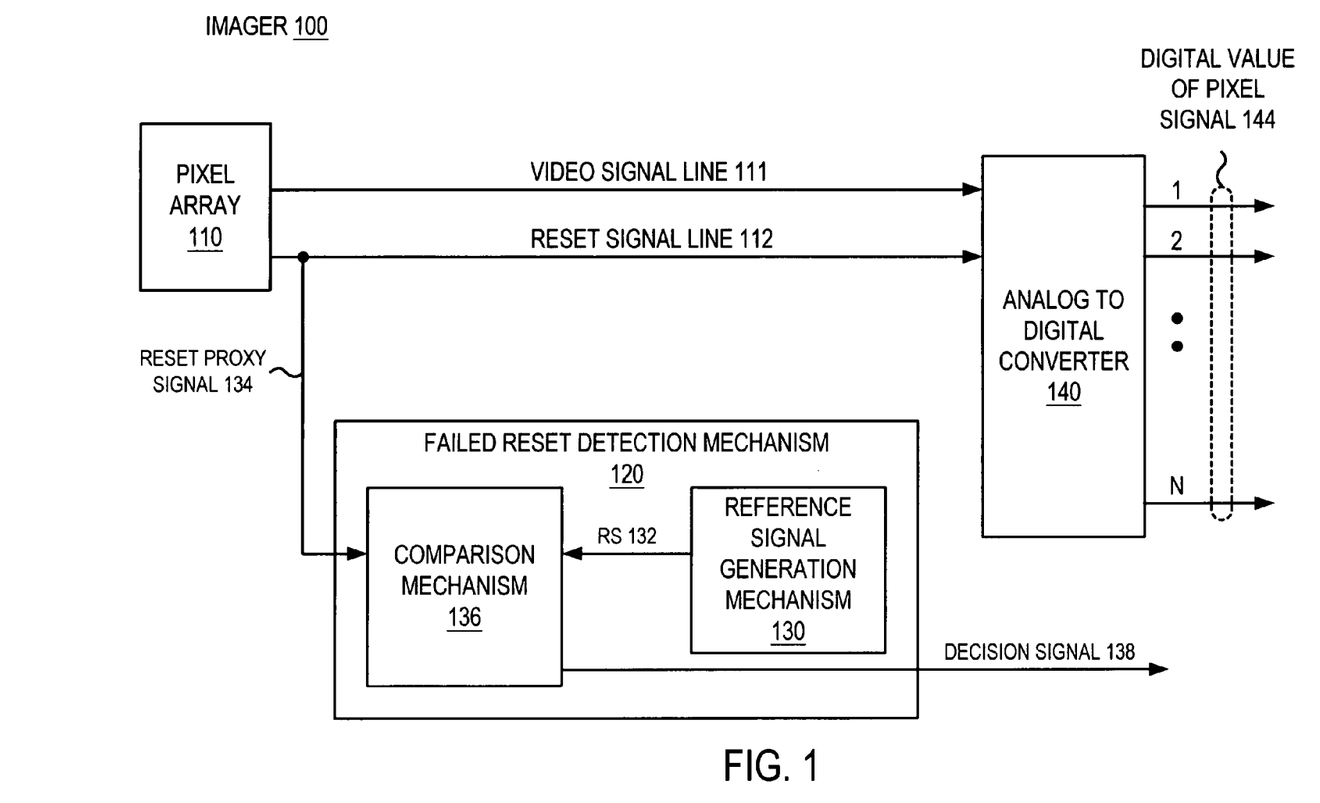
FIG. 1 illustrates an imager in which the failed reset detection mechanism can be incorporated according to one embodiment of the invention.

FIG. 1 illustrates an imager 100 in which the failed reset detection mechanism 120 can be incorporated according to one embodiment of the invention. The imager 100 (also referred to herein as an "image sensor integrated circuit") includes a pixel array 110 and an analog to digital (A/D) converter 140. The pixel array 110 includes a plurality of pixels that are arranged in rows and columns. The imager 100 includes a video signal line 111 and a reset signal line 112 that are utilized to communicate information from each pixel in the pixel array 100 to the analog to digital (A/D) converter 140. For example, the video signal line 111 is employed to communicate the post-integration signal level, and the reset signal line 112 is employed to communicate the reset signal level after reset. The analog to digital (A/D) converter 140 receives an analog version of a pixel value through lines 111 and 112 and converts the analog version into a corresponding digital version of the pixel signal 144.

The failed reset detection mechanism 100 includes a reference signal generation mechanism 130 that generates a reference signal (RS) 132. The failed reset detection mechanism 100 also includes a comparison mechanism 136 that includes a first input that is coupled to the reference signal generation mechanism 130 to receive the reference signal 132 and a second input for receiving a reset proxy signal 134 (also referred to herein as a "reset indication signal"). In one embodiment, the second input is coupled to the reset signal line 112, and the reset proxy signal 134 is the reset signal read from the reset signal line 112. Based on the reference signal 132 and the reset proxy signal 134, the comparison mechanism 136 generates a decision signal 138 (hereinafter referred to as a "reset status signal") that indicates whether a failed reset or defective reset has been detected.

Failed Reset Detection Mechanism 220 and Analog Reset Correction Mechanism 230

Figure 2:
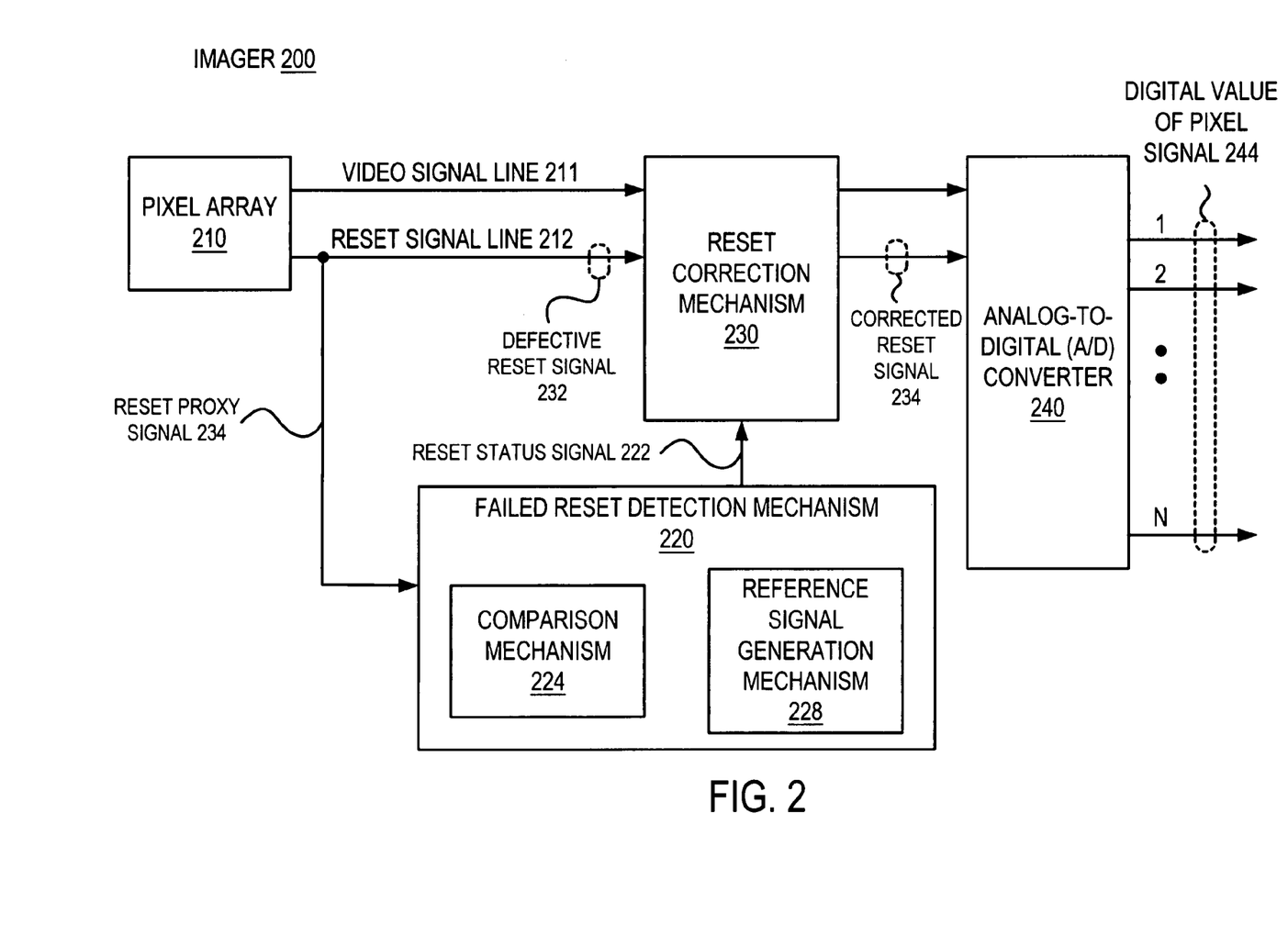
FIG. 2 illustrates a block diagram of the failed reset detection mechanism according to one embodiment of the invention in which a reset signal is corrected in the analog domain.

FIG. 2 illustrates an imager 200 with a failed reset detection mechanism 220 and a reset correction mechanism 230 according to one embodiment of the invention in which a reset signal is corrected in the analog domain. The imager 200 (also referred to herein as an "image sensor integrated circuit") includes a pixel array 210 and an analog to digital (A/D) converter 240.

The imager 200 includes a failed reset detection mechanism 220 that generates a reset status signal 222. The failed reset detection mechanism 220 includes a reference signal generation mechanism 228 and a comparison mechanism 224. The construction and operation of the elements in FIG. 2 (e.g., reference signal generation mechanism 228 and comparison mechanism 224) are similar to the elements with common suffix numeral designations. As these elements were previously described with reference to FIG. 1, this description will not be repeated herein.

The imager 200 also includes a reset correction mechanism 230 that is coupled to the video signal line 211, the reset signal line 212, and the analog-to-digital (A/D) converter 240. The reset correction mechanism 230 receives a defective reset signal 232 from the reset signal line 212 and generates a corrected reset signal 234. It is noted that both the defective reset signal 232 and the corrected reset signal 234 are analog signals. In this regard, the reset correction mechanism 230 corrects the defective reset signal 232 in the analog domain (i.e., prior to conversion into the digital domain by the A/D converter 240).

Failed Reset Detection Mechanism 320 and Digital Reset Correction Mechanism 350

Figure 3:
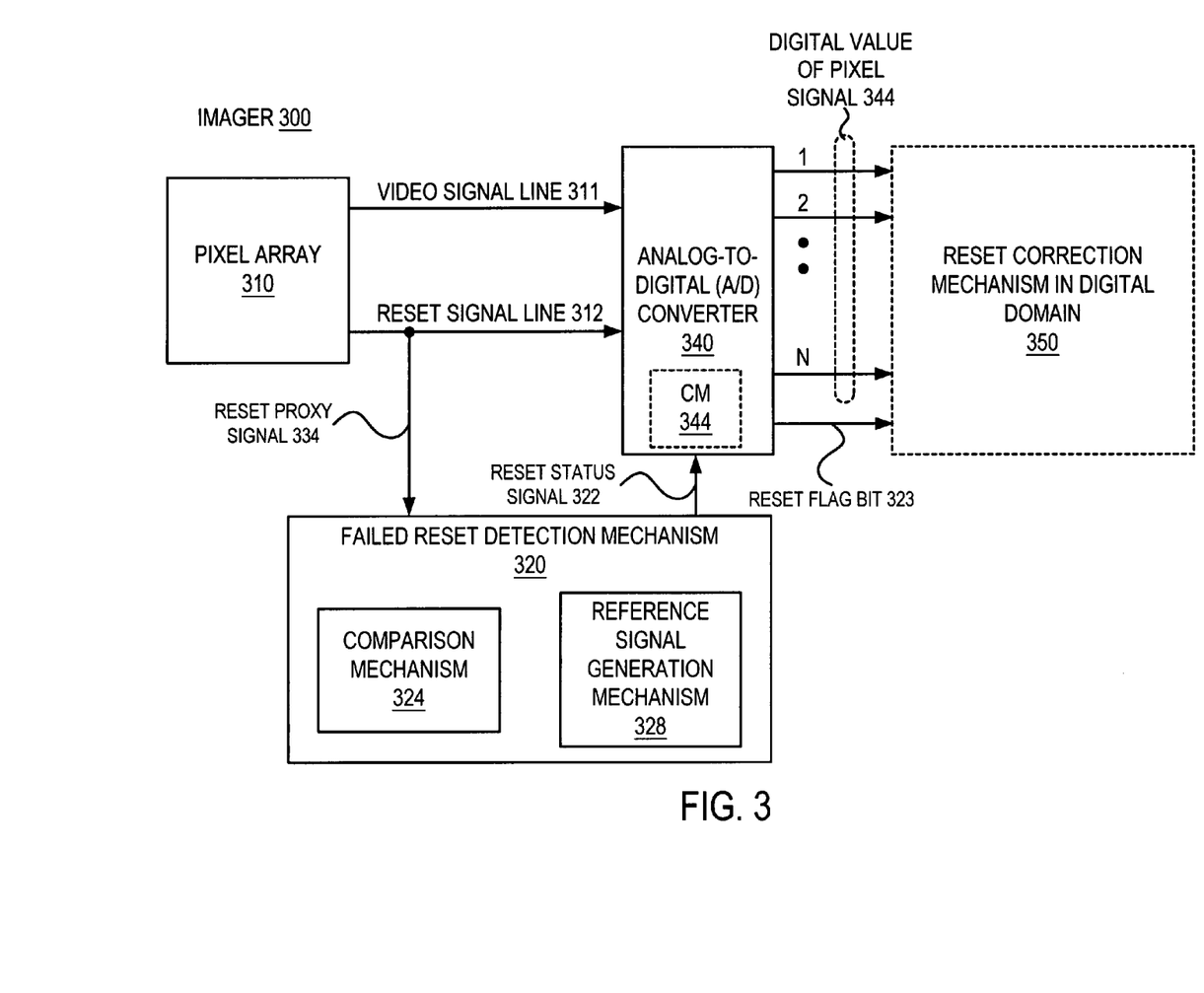
FIG. 3 illustrates a block diagram of the failed reset detection mechanism according to one embodiment of the invention in which a reset flag signal is generated and associated with a pixel value, and a reset signal is corrected in the digital domain.

FIG. 3 illustrates a block diagram of the failed reset detection mechanism 320 according to one embodiment of the invention in which a reset flag signal is generated and associated with a pixel value, and a reset signal is corrected in the digital domain. The imager 300 (also referred to herein as an "image sensor integrated circuit") includes a pixel array 310 and an analog to digital (A/D) converter 340.

The imager 300 includes a failed reset detection mechanism 320 that generates a reset status signal 322. The failed reset detection mechanism 320 includes a reference signal generation mechanism 328 and a comparison mechanism 324. The construction and operation of the elements in FIG. 3 (e.g., reference signal generation mechanism 328 and comparison mechanism 324) are similar to the elements with common suffix numeral designations. As these elements were previously described with reference to FIG. 1, this description will not be repeated herein.

The imager 300 includes a communication mechanism 344 that receives the analog reset status signal 322 and converts the analog reset status signal 322 into a corresponding digital version of the reset status signal (e.g., reset flag bit or signal 323). The imager 300 also includes a reset correction mechanism 350 that is coupled to the analog-to-digital (A/D) converter 340. The reset correction mechanism 350 receives a defective reset signal 232 from the common pixel signal line 214 and generates a corrected reset signal 234. It is noted that both the defective reset signal 344 and the reset flag bit 323 are digital signals. In this regard, the reset correction mechanism 350 corrects the defective reset signal 344 in the digital (i.e., after conversion into the digital domain by the A/D converter 340). The reset correction mechanism 350 can include hardware, software, firmware or a combination thereof to perform the reset signal correction operation.

Failed Reset Detection Mechanism Utilizing Voltage Sensing

Figure 4:
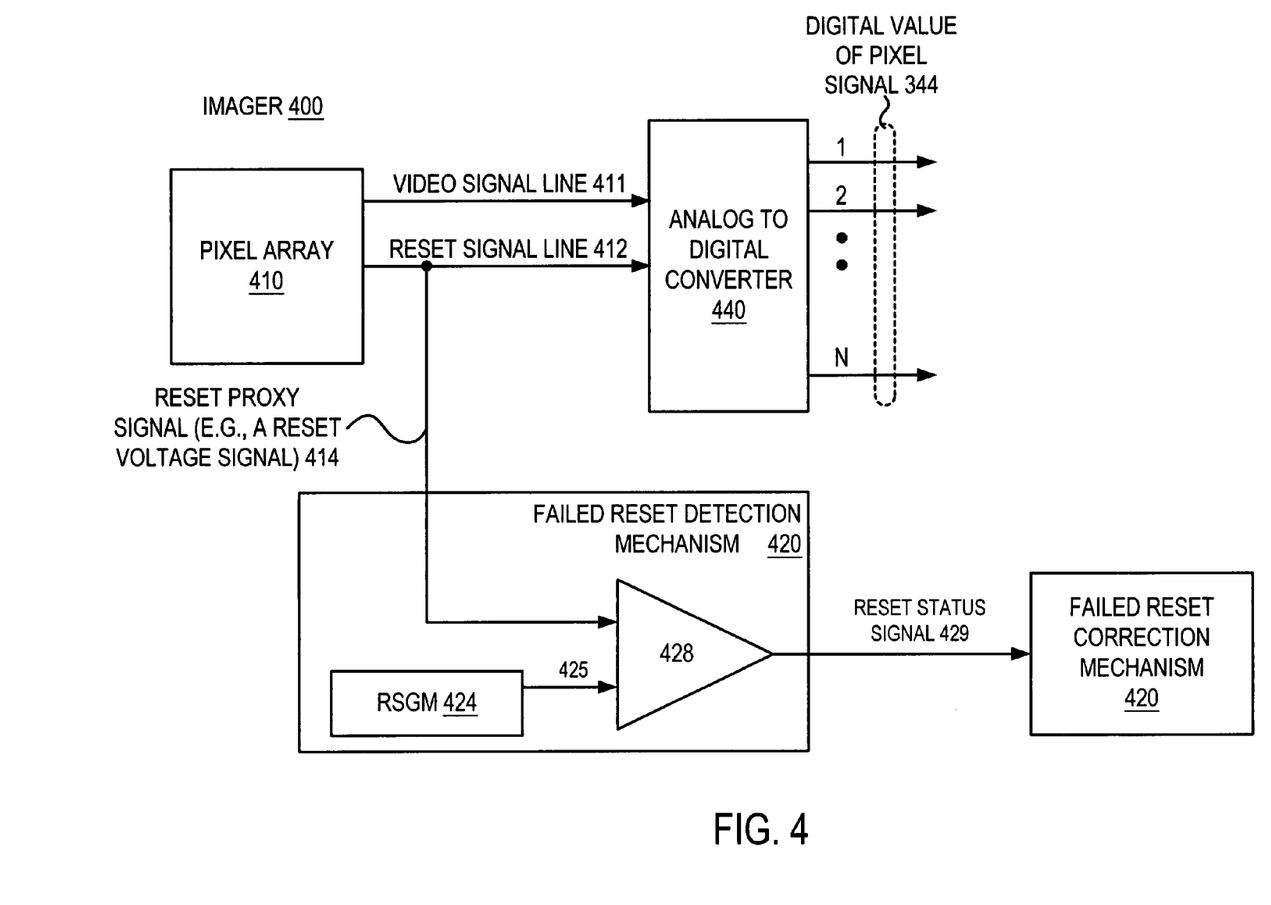
FIG. 4 illustrates a first implementation of the failed reset detection mechanism of FIG. I according to one embodiment of the invention that utilizes voltage sensing.

FIG. 4 illustrates a first implementation of the failed reset detection mechanism 420 of FIG. 1 according to one embodiment of the invention that utilizes voltage sensing. The imager 400 (also referred to herein as an "image sensor integrated circuit") includes a pixel array 410 and an analog to digital (A/D) converter 440.

The imager 400 includes a failed reset detection mechanism 420 that generates a reset status signal 429. The failed reset detection mechanism 420 includes a reference signal generation mechanism (RSGM) 424 and a comparison mechanism 428. The construction and operation of the elements in FIG. 4 (e.g., pixel array 410 and A/D converter 440) are similar to the elements with common suffix numeral designations. As these elements were previously described with reference to FIG. 1, this description will not be repeated herein.

Exemplary implementations of the reference signal generation mechanism (RSGM) 424 are described hereinafter with reference to FIGS. 5-7. The comparison mechanism can be implemented with a voltage comparator circuit 428. The comparator circuit 428 includes a first input for receiving a reset proxy signal (e.g., a reset voltage signal) from the pixel array 410, a second input for receiving a reference signal from the RSGM 424, and an output for generating a reset status signal 429. As described previously, the reset status signal 429 indicates whether a reset operation was successful or unsuccessful. The operation and construction of voltage comparators are known by those of ordinary skill in the art and will not be described further herein.

Exemplary Implementations of Reference Signal Generation Circuit

Figure 5:
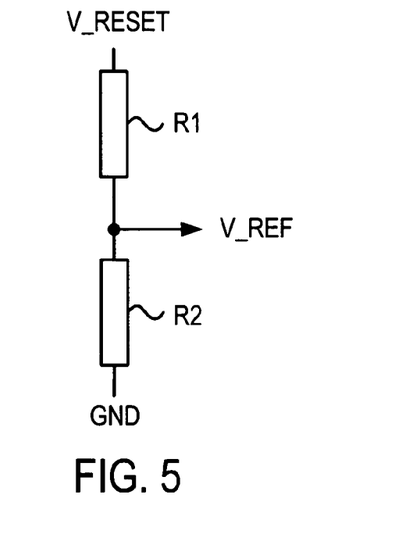
FIG. 5 illustrates one embodiment of a reference signal generation circuit according to one embodiment of the invention that may be utilized with the comparator of FIG. 4.

FIG. 5 illustrates one embodiment of a reference signal generation circuit 510 according to one embodiment of the invention that may be utilized with the comparator of FIG. 4. In this embodiment, the reference signal generation circuit may be implemented by a voltage divider circuit that includes a first resistor (R1) and a second resistor (R2). The reference voltage signal (e.g., V_ref) may be read from the node designated by (N1) and is a predetermined voltage (e.g., V_reset) multiplied by a factor that is determined by the value of the resistors (R1 and R2). For example, in one embodiment, the reference voltage signal is given by the following expression:

$$V\_ref = R2/(R2+R1) * V\_reset.$$

Figure 6:
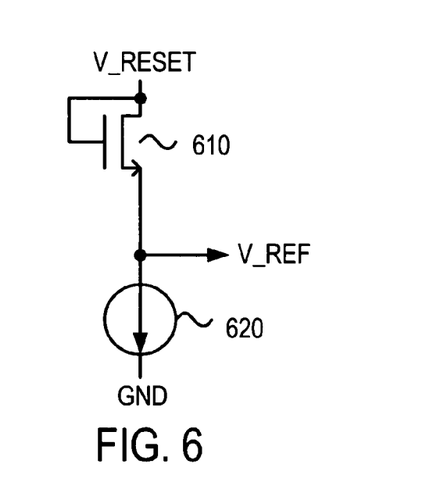
FIG. 6 illustrates a second embodiment of a reference signal generation circuit according to one embodiment of the invention that may be utilized with the comparator of FIG. 4.

FIG. 6 illustrates a second embodiment of a reference signal generation circuit according to one embodiment of the invention that may be utilized with the comparator of FIG. 4. In this embodiment, the reference signal generation circuit may be implemented by a transistor 610 in series with a current source 620. The transistor 610 includes a drain electrode, a gate electrode and a source electrode. The drain electrode is coupled to the gate electrode. In this manner, the reference voltage signal (e.g., V_reset) is a fixed threshold value (e.g., a threshold voltage drop) below a predetermined signal (e.g., V_reset).

Figure 7:
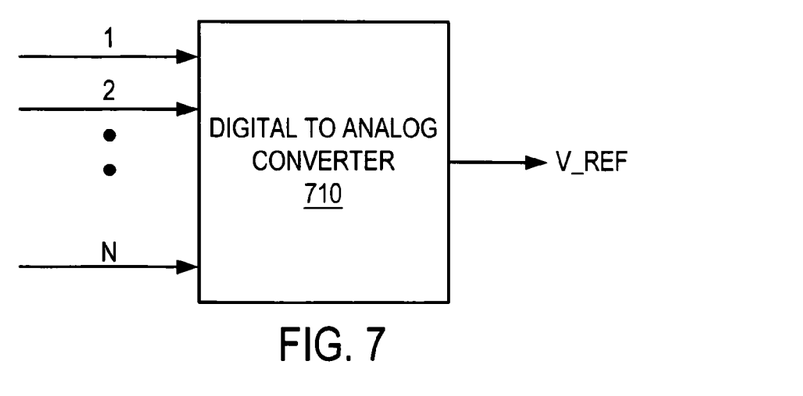
FIG. 7 illustrates a third embodiment of a reference signal generation circuit according to one embodiment of the invention that may be utilized with the comparator of FIG. 4.

FIG. 7 illustrates a third embodiment of a reference signal generation circuit according to one embodiment of the invention that may be utilized with the comparator of FIG. 4. In this embodiment, the reference signal generation circuit may be implemented by a digital to analog converter (DAC) 710 that includes an input for receiving a digital input and an output for generating an analog version of the digital input. It is noted that the reference signal generation circuit according to this embodiment can generate a precise reference signal (e.g., a voltage reference signal (V_ref)).

Failed Reset Detection Mechanisms Utilizing Current Sensing

Figure 8:
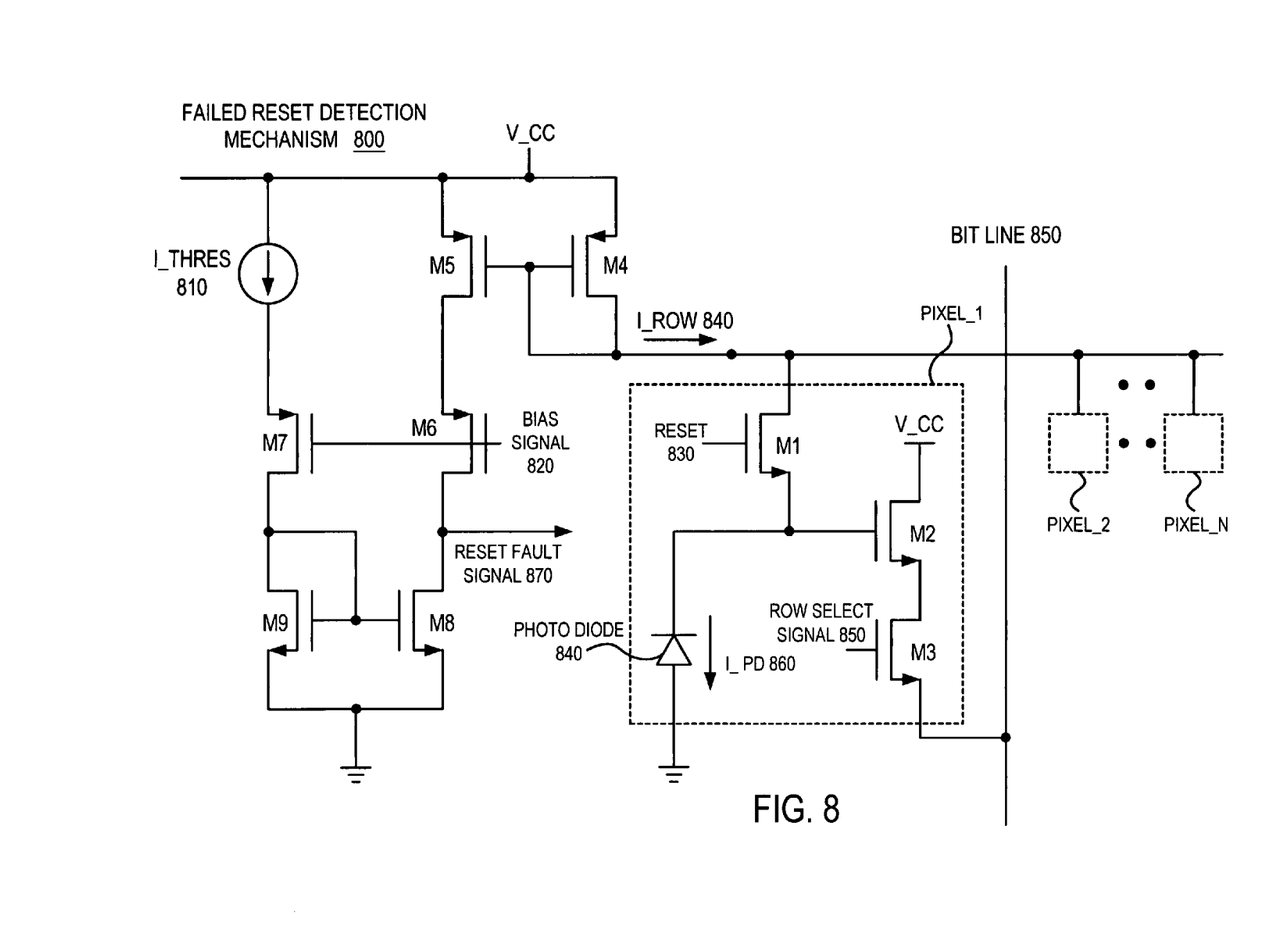
FIG. 8 illustrates a second implementation of the failed reset detection mechanism of FIG. 1 according to one embodiment of the invention that employs current sensing.

FIG. 8 illustrates a second implementation of the failed reset detection mechanism of FIG. 1 according to one embodiment of the invention that employs current sensing. The mechanism 800 includes transistor M4, transistor M5, transistor M6, transistor M7, transistor M8, transistor M9, and a current source 810 that generates a current (I_thres). It is noted that current 840 for a row (I_row) is mirrored from transistor M4 to transistor M5 and then compared with a threshold current 810 (I_thres) to generate a reset fault signal 870. The operation and construction of current comparators are known by those of ordinary skill in the art and will not be described further herein. A predetermined bias signal 820 (e.g., V_bias_1) is provided to the gate of transistor M6 and transistor M7.

Figure 9:
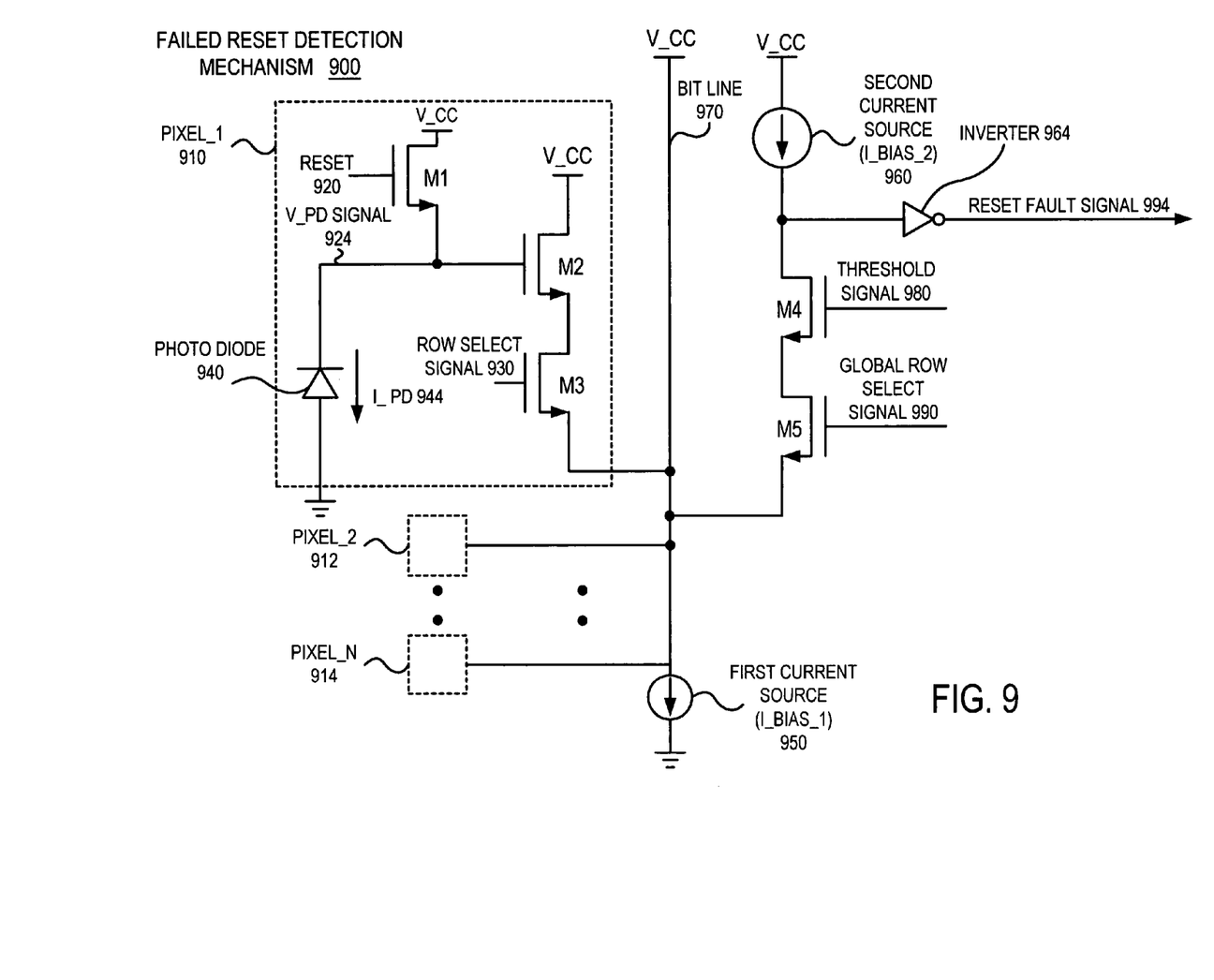
FIG. 9 illustrates a third implementation of the failed reset detection mechanism of FIG. 1 according to one embodiment of the invention.

FIG. 9 illustrates a third implementation of the failed reset detection mechanism of FIG. 1 according to one embodiment of the invention. The mechanism 900 includes transistor M4, transistor M5, a first current source 950 that generates a first current (I_bias_1), a second current source 960 that generates a second current (I_bias_2), and an inverter 964. The operation of the circuit 900 is as follows. When the signal 924 (also referred to herein as the V_pd signal or the photo diode node signal) at the gate of transistor M2 is high, transistor M4 is off, and the reset fault signal 994 is de-asserted (e.g., a logic low or logic zero). As the V_pd signal 924 drops or decreases and becomes equal to the threshold signal (e.g., voltage threshold signal), transistor M2 and transistor M4 split the first current (I_Bias_1). When the threshold signal is greater than the V_pd signal 924, all the first current (I_Bias_1) flows through transistor M4, and the reset fault signal becomes asserted (e.g., a logic high or logic one). In one embodiment, the global row select signal 990 is the logic OR of all the reset signals for each of the rows. For example, in the case where there are 1024 rows, the global row select signal 990 is the logic OR of reset signals (RS_1, RS_2, ... RS_1024).

It is noted that circuit elements, such as second current source 960, inverter 964, and transistors M4 and M5 are column wise circuitry (i.e., these circuit elements are repeated for each column in the pixel array).

It is noted that the first current source 950 is greater than a second current source 960. Also, it is noted that transistor M2 is similar to transistor M4, and transistor M3 is similar to M5. By "similar", we mean that the transistors are sized in a similar manner (e.g., having a gate with similar width and length dimensions and similar W/L ratios).

Correction

Correction can be performed in either the analog domain or in the digital domain. In the analog domain, correction may be performed as follows. According to one embodiment of the invention, a pixel with a failed reset is corrected by forcing or adjusting the output of the pixel to a predetermined value.

For example, since often times a failed reset causes a difference between the reset level and the level after integration to be zero, the pixel output can be artificially adjusted to a large difference (e.g., a maximum difference between the reset signal and a signal after integration) or an intermediate value. In this manner, the measured pixel value is adjusted to a more appropriate value that avoids dark spots or other artifacts.

In the digital domain, correction may be performed as follows. When correction is performed in the digital domain, a particular pixel with the failed reset is tagged with a special flag (e.g., an extra bit may be add to the bits utilized to convey the pixel value). For example, when a defective reset has been detected, the bit or flag is set to 1. When, a defective reset has not been detected, the bit or flag is set to 0. It is noted that although the pixel with the defective reset is tagged, the pixel value is not modified or adjusted, but provided as is to the image processing integrated circuit. The digital image processor when performing image processing utilizes the flag and other factors, such as the values of surrounding pixels, to adjust the read pixel value to a more appropriate value that avoids dark spots or other artifacts.

Detection of Failed Reset

The failed reset detection mechanism according to one embodiment of the invention can include a comparator that includes a first input, a second input, and an output for generating an output signal that indicates whether a failed reset has been detected. The first input receives a reset indication signal. The second input receives a reset reference signal. The comparator compares the reset indication signal and the reference signal and based on the comparison selectively generates an output signal that either indicates that a failed reset has been detected or that a failed reset has not been detected.

Reset Reference Signal

In one embodiment, the reset reference signal may be a static reference signal, such as a range of values around a predetermined reference value. For example, in a 3T pixel cell design, the reference value can be a percentage of the maximum reset signal (e.g., 60% of V+−2*V_threshold, where V+ is the power supply signal). In this case, when the reset value is less than sixty percent of the difference between V+ and the two times the threshold voltage of the transistors in the pixel, a failed reset is detected. Similarly, in a 4T pixel cell design, the reference value can be a predetermined percentage of the maximum reset signal (e.g., 60% of V+−V_threshold, where V+ is the power supply signal). In this case, when the reset value is less than sixty percent of the difference between V+ and the threshold voltage of one transistor in the pixel, a failed reset is detected.

It is noted that pixel architecture is not limited to the CMOS APS architectures (e.g., 3T, 4T) shown in the figures, but instead can be any pixel architecture that is known by those of ordinary skill in the art. It is further noted that the reset reference signal may be adjusted or tailored to meet the requirements of a particular pixel architecture and of the design of the imager.

In an alternative embodiment, the reset reference signal may be dynamic reference signal. It is noted that the reset reference signal may include multiple values the use of which depend on various factors. In this manner, by having a reset reference signal that dynamically adjusts to various conditions, the accuracy of the failed reset detection mechanism of the invention may be enhanced. For example, the reset reference signal may be tuned, programmed, or dynamically adjusted based on factors that include, but are not limited to, color of the pixel, frame rate, and average brightness of adjacent pixels.

Processing Performed by the Fail Reset Detection Mechanism

Figure 10:
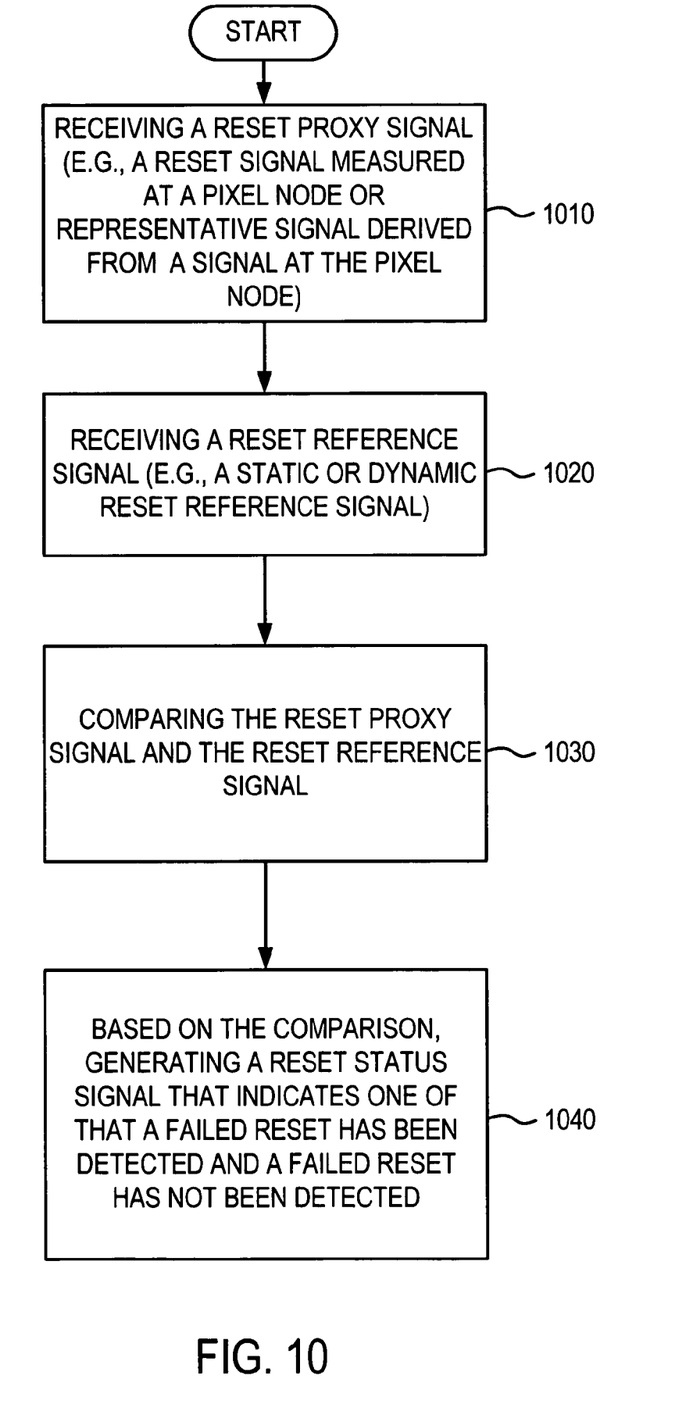
FIG. 10 is a flowchart illustrating a method performed by the failed reset detection mechanism of FIG. 1 according to one embodiment of the invention.

FIG. 10 is a flowchart illustrating a method performed by the failed reset detection mechanism of FIG. 1 according to one embodiment of the invention. In step 1010, a reset proxy signal (hereinafter also referred to as "reset indication signal") is received. The reset proxy signal can be, for example, a reset signal (e.g., a voltage signal or a current signal) at a reset node, a signal that is based upon or derived from a signal at the reset node, or any signal that can be used to represent a reset signal or that can be utilized to access whether a successful reset operation has been performed. The success or failure of a reset operation can be based on a determination whether a predetermined reset signal has been established at the reset node.

In step 1020, a reset reference signal is received. The reset reference signal can be a predetermined signal (e.g., a predetermined voltage signal or a predetermined current signal).

In step 1030, the reset proxy signal and the reset reference signal are compared. For example, this comparison step can include the step of determining whether the reset proxy signal is greater than the reset reference signal, whether the reset proxy signal is less than the reset reference signal, or whether the reset proxy signal is equal to the reset reference signal.

In step 1040, based on the comparison, a reset status signal is generated. The reset status signal indicates either that a failed reset has been detected or that a failed reset has not been detected. For example, when the reset proxy signal and the reset reference signal are in a first predetermined relationship (e.g., the reset proxy signal greater than or equal to the reset reference signal), the reset status signal is asserted, thereby indicating a successful reset operation. When the reset proxy signal and the reset reference signal are in a second predetermined relationship (e.g., the reset proxy signal less than the reset reference signal), the reset status signal is de-asserted, thereby indicating an unsuccessful or failed reset operation.

In one embodiment the reset status signal is a failed reset flag or bit (e.g., Failed_Reset_Flag signal) that is asserted when a failed reset has-been detected-and that is not asserted when a failed reset has not been detected.

The failed reset detection mechanism according to the invention may be incorporated into a variety of different electronic devices that employ pixels or imaging electronics. These devices include, but are not limited to, mobile phones, video phones, personal digital assistants, image-enabled appliances, digital image capture cameras (e.g., still and video cameras), digital still mini cameras, embedded automotive applications, optical navigation devices (e.g., optical mouse) and monitoring equipment.

It is noted that the interface mechanisms according to the invention are not limited to the embodiments and applications described above, but instead can be utilized to detect failed reset for other types of applications noted previously.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An apparatus for detecting a failed reset in a pixel comprising:
   a first input that receives a reset indication signal;
   a second input that receives a reset reference signal;
   a comparator that receives the reset indication signal and the reset reference signal and compares the reset indication signal and the reset signal and based on the comparison selectively generates a reset status signal that indicates one of that a failed reset has been detected and a failed reset has not been detected.

2. The apparatus of claim 1 wherein the reset indication signal is a voltage signal; wherein the reset reference signal is a voltage signal, and the comparator is
   a voltage comparator that receives the reset indication signal and the reset reference signal, compares the reset indication signal and the reset signal and based on the comparison selectively generates an output signal that indicates one of that the failed reset has been detected and the failed reset has not been detected.

3. The apparatus of claim 1 wherein the reset indication signal is a current signal; wherein the reset reference signal is a current signal, and the comparator is
   a current comparator that receives the reset indication signal and the reset reference signal, compares the reset indication signal and the reset signal and based on the comparison selectively generates an output signal that indicates one of that the failed reset has been detected and the failed reset has not been detected.

4. The apparatus of claim 1 further comprising:
   a mechanism that corrects the reset signal in the analog domain.

5. The apparatus of claim 1 further comprising:
   a communication mechanism that provides the reset status signal to a digital domain and
   a mechanism that corrects the reset signal in the digital domain.

6. A method for detecting a failed reset in a pixel includes:
   receiving a reset proxy signal;
   receiving a reset reference signal;
   comparing the reset proxy signal and the reset reference signal;
   based on the comparison, generating a reset status signal that indicates one of that a failed reset has been detected and a failed reset has not been detected.

7. The method of claim 6 wherein the reset proxy signal includes one of a reset signal, a voltage reset signal, a current reset signal, a signal that is derived from a signal at a predetermined node in the pixel, a signal that represents a reset signal, and a signal that can be utilized to determine whether a successful reset operation has been performed in the pixel.

8. The method of claim 6 wherein the reset reference signal includes one of a static reset reference signal and a dynamic reference signal.

9. The method of claim 6 wherein comparing the reset proxy signal and the reset reference signal includes one of
   determining whether the reset proxy signal is greater than the reset reference signal;
   determining whether the reset proxy signal is less than the reset reference signal; and
   determining whether the reset proxy signal is equal to the reset reference signal.

10. The method of claim 6 further comprising:
    correcting the reset signal in the analog domain.

11. The method of claim 6 further comprising:
    providing the reset status signal to a digital signal processor and
    correcting the reset signal in the digital domain.

\* \* \* \* \*